United States Patent [19]

Bourgeois

[11] 4,142,625
[45] Mar. 6, 1979

[54] HOLDING CONVEYOR SYSTEM

[76] Inventor: Ronald D. Bourgeois, 38 Ellison Park, Waltham, Mass. 02154

[21] Appl. No.: 856,852

[22] Filed: Dec. 2, 1977

[51] Int. Cl.² .............................................. B65G 37/00
[52] U.S. Cl. ..................................... 198/570; 198/575; 198/779; 198/834
[58] Field of Search ............... 198/570, 575, 580, 779, 198/834, 835

[56] References Cited

U.S. PATENT DOCUMENTS

| 1,553,975 | 9/1925 | Bausman | 198/835 |
| 1,919,837 | 7/1933 | Gotthardt | 198/570 |
| 3,079,979 | 3/1963 | Flood | 198/570 |
| 3,115,236 | 12/1963 | Anetsberger | 198/835 |
| 3,234,984 | 2/1966 | Cantoni et al. | 198/570 |
| 3,291,287 | 12/1966 | Rehm | 198/835 |
| 3,476,231 | 11/1969 | Bower | 198/570 |

FOREIGN PATENT DOCUMENTS

| 2233832 | 2/1973 | Fed. Rep. of Germany | 198/835 |
| 2414943 | 10/1974 | Fed. Rep. of Germany | 198/835 |

Primary Examiner—Joseph E. Valenza
Attorney, Agent, or Firm—Joseph S. Iandiorio

[57] ABSTRACT

A holding conveyor system including a conveyor frame; first and second conveyor belts carried by the frame laterally adjacent each other; a drive shaft rotatably supported by the conveyor frame; first and second drive means for driving the first and second conveyor belts, respectively; each of the conveyor belts including a plurality of low-friction rollers interconnected at their ends by links; the first drive means including first drive sprocket means rotatable with the drive shaft and a pinch block above the first drive sprocket means for guiding the first conveyor belt about the top course over the first drive sprocket means which drives the first conveyor belt in a first direction; the second drive means including a second drive sprocket means rotatable with the drive shaft and a pair of pinch rollers disposed one on either side of the second drive sprocket means for guiding the second conveyor belt about the bottom course under the second drive sprocket means, which drives the second conveyor belt in a second direction opposite to the first direction.

3 Claims, 6 Drawing Figures

HOLDING CONVEYOR SYSTEM

FIELD OF INVENTION

This invention relates to a holding conveyor system in which a pair of adjacent frictionless roller conveyor belts are separately coursed one over one drive sprocket assembly and the other under a second which drive the belts in opposite directions from a single shaft.

BACKGROUND OF INVENTION

Holding tables for conveyor systems are generally large, complex and expensive devices which use a number of synchronized drives to move adjacent belts in opposite directions. The belts may be heavy, cumbersome devices which tend too much to drag the conveyed objects with them, even when they have been blocked against further forward motion by a holding gate. Typically the size and cumbersomeness of these conveyors makes them unsuitable for use as transfer conveyors in confined locations between two primary conveyors.

In addition, the inner edges of the belts which move in paths in close proximity to one another include some means for engaging a drive wheel or sprocket, integral with or at least connected to the belt, such as for example a drive chain which interferes with the smooth transfer of the objects from one belt to the other.

SUMMARY OF INVENTION

It is therefore an object of this invention to provide an improved, simplified, less expensive and more effective holding conveyor system.

It is a further object of this invention to provide such a system in which both belts are driven self-synchronously from a single drive shaft.

It is a further object of this invention to provide such a system in which the belt produces virtually no drag on the goods when they are blocked from moving with the belt.

It is a further object of this invention to provide such a system in which the belt is sufficiently narrow and articulate to reverse direction at each end of its path and turn about a small radius curve.

It is a further object of this invention to provide such a system in which the inner edges of the belts are relatively free from obstacles to the transfer of goods across from one belt to the other.

This invention features a holding conveyor system which includes a conveyor frame and first and second conveyor belts carried by the frame laterally adjacent one another. A drive shaft rotatably supported by the conveyor frame drives first and second conveyor belts, respectively. Each of the conveyor belts includes a plurality of low-friction rollers interconnected at their ends by links. The first drive means includes first drive sprocket means rotatable with the drive shaft, and a pinch block above the first drive sprocket means for guiding the first conveyor belt about the top course over the first drive sprocket means, which drives the first conveyor belt in a first direction. The second drive means includes a second drive sprocket means rotatable with the drive shaft and a pair of pinch rollers disposed one on either side of the second drive sprocket means for guiding the second conveyor belt about the bottom course under the second drive sprocket means, which drives the second conveyor belt in a second direction opposite to the first direction.

In preferred embodiments, each of the conveyor belts includes a plurality of low-friction rotatable rollers interconnected at their inner edges adjacent the other belt by links and at their outer edges by an integral drive chain assembly. In addition, each drive sprocket means may include an inner drive sprocket for engaging with and driving the rollers proximate their links, and an outer drive sprocket for engaging with and driving a drive chain integral with the rollers.

DISCLOSURE OF PREFERRED EMBODIMENT

Other objects, features and advantages will occur from the following description of a preferred embodiment and the accompanying drawings, in which.

Figure 1:
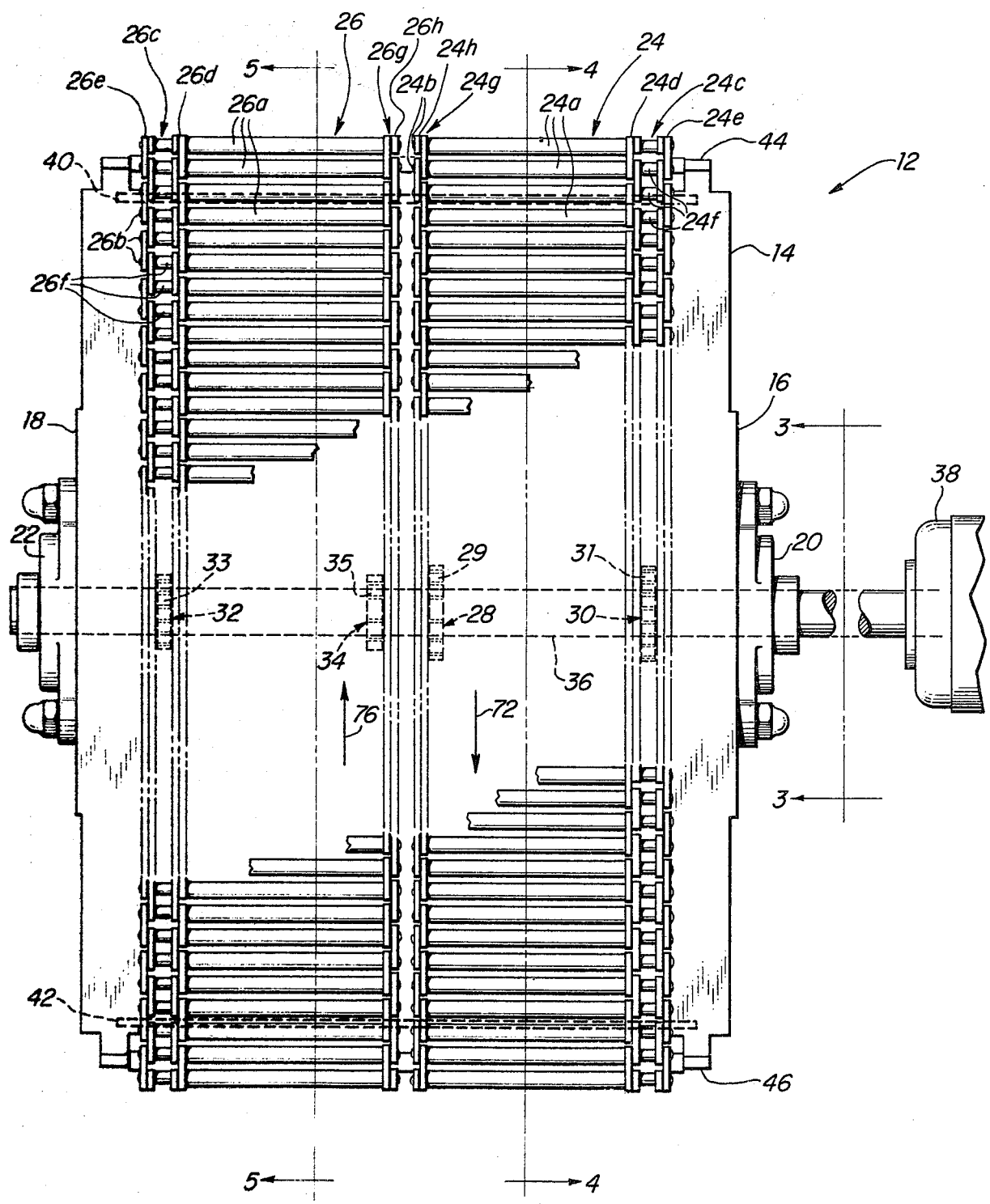
FIG. 1 is a plan view with portions deleted of a holding conveyor system according to this invention.
Figure 4:
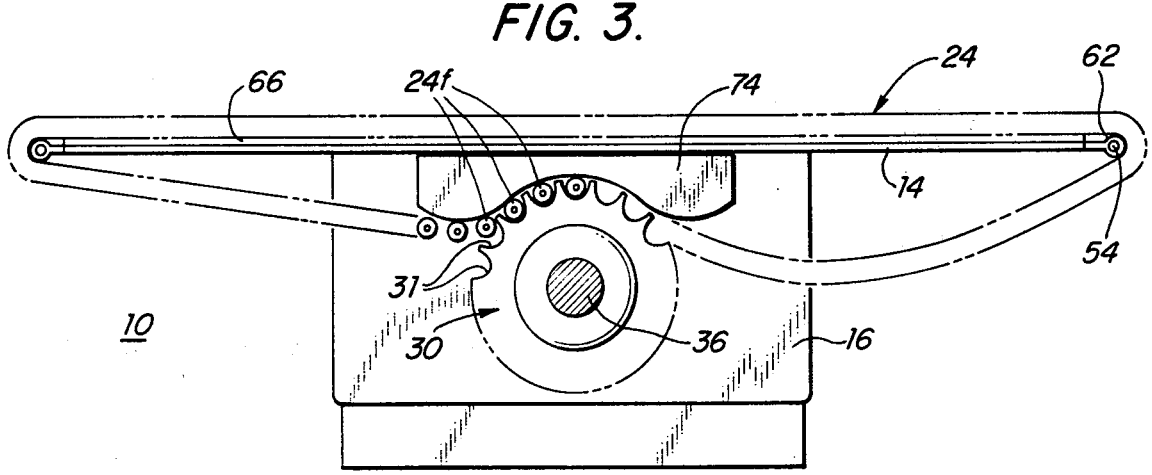
Figure 5:
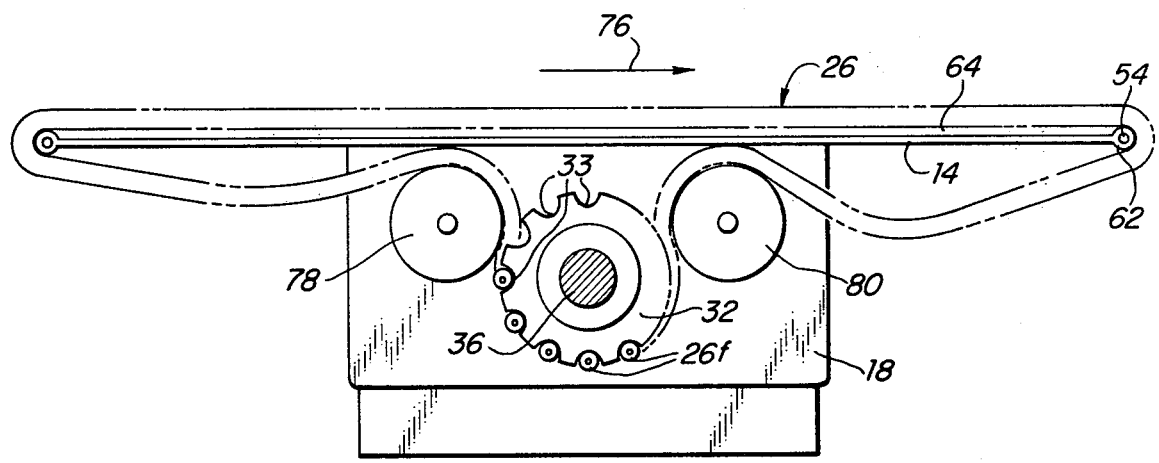

FIG. 4 if a cross-sectional view taken along line 4—4 of FIG. 1;

FIG. 5 is a cross-sectional view taken along line 5—5 of FIG. 1; and

Figure 6:
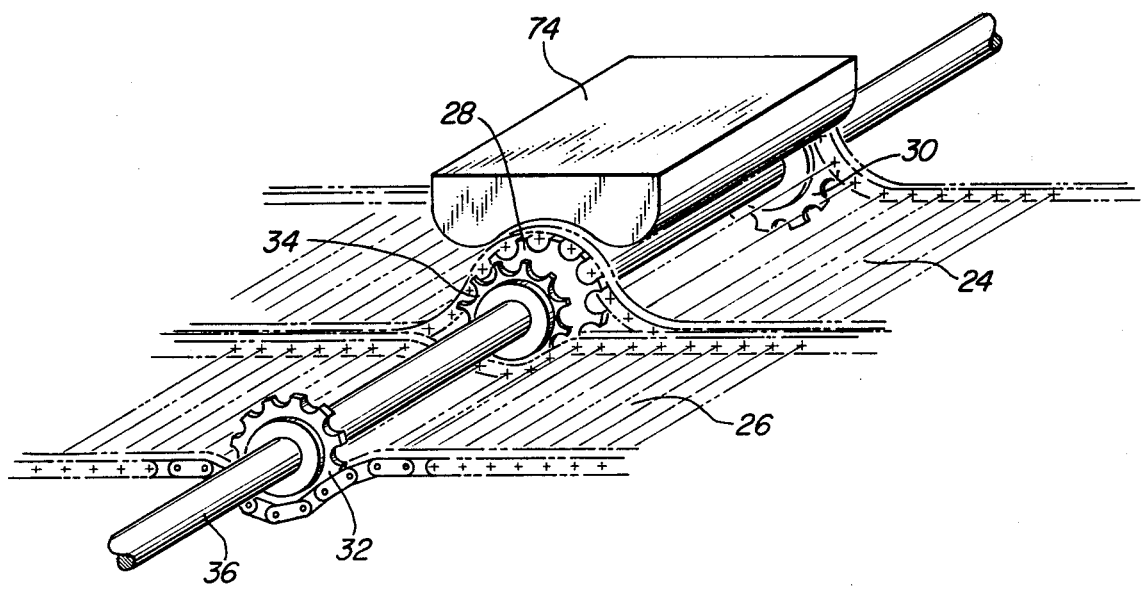

FIG. 6 is a schematic diagram of the drive shaft and sprockets and a portion of each of the belts illustrated in FIG. 1.

The invention may be accomplished with a dual-belt holding conveyor system including a conveyor frame and two conveyor belts carried by the frame in lateral adjacent relationship to each other. A drive shaft is rotatably supported by the conveyor frame, and each contains drive means such as sprockets for driving the first and second conveyor belts. Each of the conveyor belts includes a plurality of low-friction rollers interconnected at their ends by links. The first drive means or sprockets cooperate with a pinch block or guide block to insure that the conveyor is properly seated in the sprocket as it moves in a path over the top of the sprocket. Similarly, the second drive means or sprocket includes a pair of pinch rollers which insure that the conveyor belt is properly engaged with the sprocket as it passes about the bottom course around the sprocket. Both of these drive means or sprockets are rotated at the same speed and in the same direction by a single shaft driven by a motor. However, because of the different drive paths of each of the belts with their respective drive means, they are driven synchronously at the same speed but in opposite directions. Typically the low-friction rollers are rotatable about their own longitudinal axis and are carried on pins interconnected at their inner edges adjacent the other belt by links and at their outer edges by an integral drive chain assembly which includes two pairs of links with rollers between them. The rollers may be larger or smaller in diameter than the primary rollers of the conveyor belt. Each drive means then includes two sprockets, one which engages with the drive chain, the other which engages with the rollers themselves at the inner edge of the belt near the links. If the primary rollers are of a different diameter than the drive chain rollers, the sprocket teeth must be commensurately modified in order to accommodate the difference in size.

There is shown in FIG. 1 a holding conveyor system according to this invention having a conveyor frame 12 including a top plate 14, side plates 16 and 18, and bearings 20, 22. A pair of conveyor belts 24, 26 are carried on frame 12 and driven by sprockets 28, 30 and 32, 34 respectively, beneath plate 14, which are fixed to and driven by drive shaft 36 powered by motor 38 and supported in bearings 20, 22.

Belt 24 is formed of a plurality of low-friction, e.g. nylon or Teflon, rollers 24a, which are rotatably mounted on pins 24b. The rollers are interconnected at the outer edge by chain 24c, which also acts as a drive chain engaged by sprocket 30. Drive chain 24c includes two sets of links 24d, 24e, with reduced diameter rollers 24f, mounted on pins 24b along with main roller 24a. At the inner edge 24g, belt 24 is driven by sprocket 28, which engages the rollers 24a at links 24h. Sprocket 30, which engages with the reduced rollers 24f, has smaller sprocket holes 31 than the sprocket holes 29 of sprocket 28 in order to accommodate the reduced size of rollers 24f. Belt 26 is formed in a similar manner and sprockets 32 and 34 have similarly proportional sprocket holes 33 and 35.

Gates 40, 42 may be positioned at either or both ends of conveyor 10 to block forward motion of the objects with respect to each of belts 24 and 26 and thereby cause them to transfer across links 24h and 26h from left to right at the upper end, FIG. 1, and from right to left at the lower end.

Figure 2:
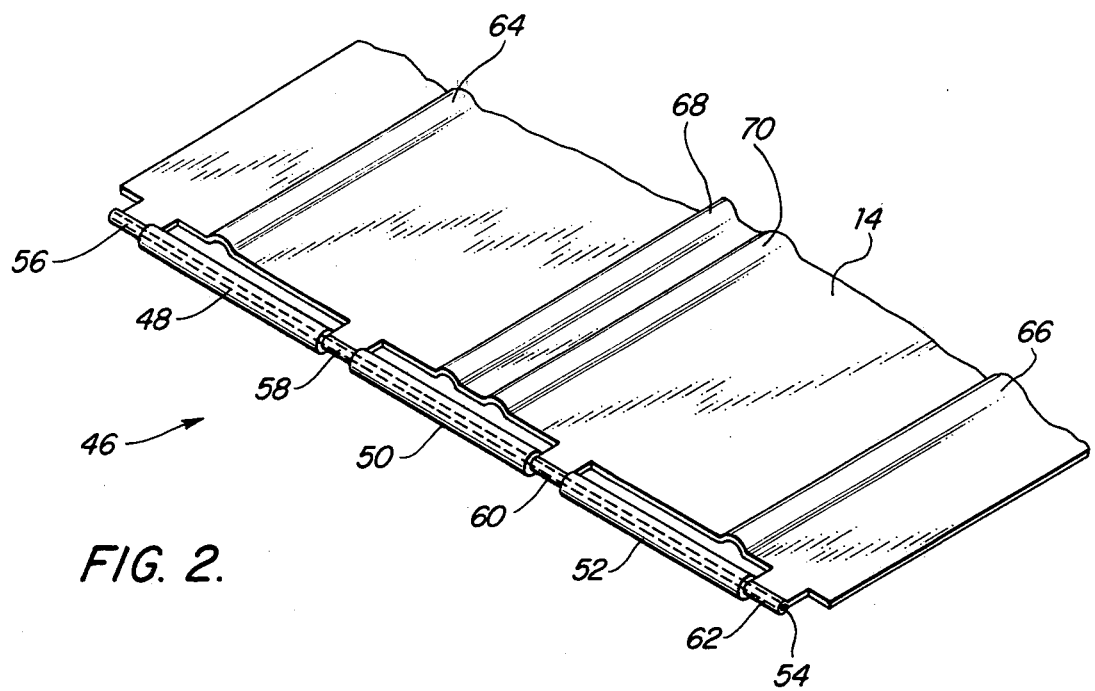
FIG. 2 is an axonometric view of an alternate construction of an end portion of the conveyor frame shown in FIG. 1.

The edge 44 of plate 14, about which articulate roller belts 24 and 26 turn to reverse direction, may be simply the thin edge 44 of plate 14 or, more typically, may be an edge 46 including a plurality of rollers 48, 50, 52, FIG. 2, rotatably mounted on shaft 54 held in bearings 56, 58, 60, and 62, formed on the edge of plate 14. In addition, in preferred embodiments plate 14 may include raised tracks 64, 66 for supporting the rollers 26f, 24f and chains 26c, 24c. Additional tracks 68, 70 may be provided to support the inner edges 26g, 24g of belts 26 and 24 just adjacent links 26h, 24h.

Figure 3:
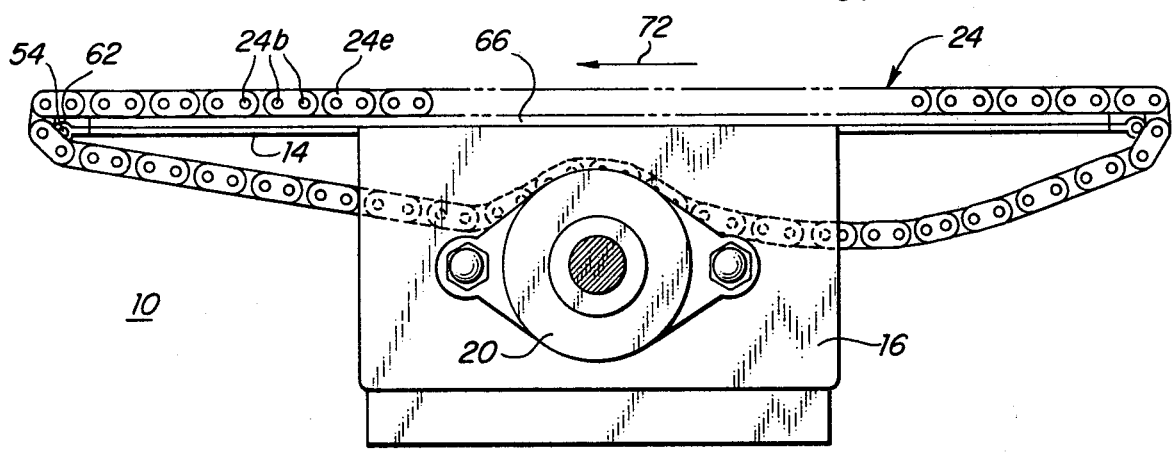
FIG. 3 is an end view taken along line 3—3 of FIG. 1.

Belt 24 is driven in the direction indicated by arrow 72, FIGS. 1 and 3, by means of sprockets 28, 30 in conjunction with pin block or guide 74, FIG. 4, which insures the seating of each of rollers 24f in the sprocket holes 29, 31 of sprockets 28 and 30, respectively.

Similarly, belt 26, FIG. 5, is driven in the direction indicated by arrow 76, FIGS. 1 and 5, by means of sprockets 32 and 34, aided by pinch rollers 78 and 80, which serve to guide rollers 26f and 26a in sprocket holes 33 and 35, respectively. The self-synchronizing operation of belts 24 and 26 driven by a single shaft 36 connected to their respective sprockets 28, 30, 32 and 34 respectively, is illustrated to greater advantage in FIG. 6, where it can be seen that belt 26 is driven about the lower course around sprockets 32 and 34, while belt 24 is being driven along the upper course by sprockets 28, 30 under power from the single drive shaft 36 powered by motor 38.

Other embodiments will occur to those skilled in the art and are within the following claims:

What is claimed is:

1. A holding conveyor system comprising: a conveyor frame; first and second conveyor belts carried by said frame laterally adjacent each other; a drive shaft rotatably supported by said conveyor frame; first and second drive means for driving said first and second conveyor belts, said belts including a plurality of low-friction article supporting rollers; said first drive means including first drive sprocket means rotatable with said drive shaft and a pinch block above said first drive sprocket means for guiding said first conveyor belt about the top course over said first drive sprocket means which drives said first conveyor belt in a first direction; said second drive means including second drive sprocket means rotatable with said drive shaft and a pair of pinch rollers disposed one on either side of said second drive sprocket means for guiding said second conveyor belt about the bottom course under said second drive sprocket means which drives said second conveyor belt in a second direction opposite to said first direction.

2. The system of claim 1 in which each of said conveyor belts includes a plurality of low-friction rotatable rollers interconnected at their inner edges adjacent the other belt by links and at their outer edges by an integral drive chain assembly.

3. The system of claim 2 in which each of said drive sprocket means includes an inner drive sprocket for engaging with and driving the rollers proximate said links and an outer drive sprocket for engaging with and driving the drive chain integral with said rollers.

* * * * *